United States Patent
Hatanaka

(10) Patent No.: US 9,975,432 B2
(45) Date of Patent: May 22, 2018

(54) VEHICLE AND CONTROL METHOD FOR VEHICLE

(71) Applicant: TOYOTA JIDOSHA KABUSHIKI KAISHA, Toyota-shi, Aichi-ken (JP)

(72) Inventor: Tatsuwo Hatanaka, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days. days.

(21) Appl. No.: 15/301,167

(22) PCT Filed: Apr. 14, 2015

(86) PCT No.: PCT/IB2015/000481
§ 371 (c)(1),
(2) Date: Sep. 30, 2016

(87) PCT Pub. No.: WO2015/162476
PCT Pub. Date: Oct. 29, 2015

(65) Prior Publication Data
US 2017/0015200 A1    Jan. 19, 2017

(30) Foreign Application Priority Data
Apr. 25, 2014 (JP) ................................ 2014-091467

(51) Int. Cl.
*B60L 3/04* (2006.01)
*B60L 11/18* (2006.01)
*B60L 3/00* (2006.01)

(52) U.S. Cl.
CPC .................................. *B60L 3/04* (2013.01);
*B60L 3/00* (2013.01); *B60L 11/1816* (2013.01);
(Continued)

(58) Field of Classification Search
CPC .......... B60L 3/04; B60L 11/1816; B60L 3/00;
B60L 11/1818; Y02T 10/7005
See application file for complete search history.

(56) References Cited

U.S. PATENT DOCUMENTS 5,952,732 A  *  9/1999  Scarpitti ................. B60R 25/21
                                                     123/198 D
7,878,035 B2 *  2/2011  Yamaguchi ............... B60R 7/06
                                                     200/43.11
(Continued)

FOREIGN PATENT DOCUMENTS

| JP | 2009-065728 A | 3/2009 |
| JP | 2009-100568 A | 5/2009 |
| JP | 2012-070577 A | 4/2012 |

*Primary Examiner* — Frederick M Brushaber
(74) *Attorney, Agent, or Firm* — Oliff PLC

(57) ABSTRACT

A vehicle includes an electric power supply, an external terminal, a lid, a switch, and an electronic control unit. The lid is disposed in the external terminal. The switch is disposed at an electric circuit between the external terminal and the electric power supply. The electronic control unit is configured to close the switch while the output or the input of the electric power is performed through the external terminal. The electronic control unit is configured to open the switch during traveling. The electronic control unit is configured to execute welding diagnosis for the switch. The electronic control unit is configured to determine whether to permit the vehicle to travel based on a result of the welding diagnosis and an open-closed state of the lid.

7 Claims, 11 Drawing Sheets

(52) U.S. Cl.
CPC ....... *B60L 11/1818* (2013.01); *Y02T 10/7005* (2013.01); *Y02T 10/7072* (2013.01); *Y02T 90/14* (2013.01)

(56) References Cited

U.S. PATENT DOCUMENTS

| | | | | |
|---|---|---|---|---|
| 9,746,522 | B2* | 8/2017 | Shiraishi | G01R 31/327 |
| 2009/0038352 | A1* | 2/2009 | Yamaguchi | B60R 7/06 |
| | | | | 70/237 |
| 2009/0057041 | A1 | 3/2009 | Kamaga | |
| 2010/0110594 | A1* | 5/2010 | Walters | B60K 6/46 |
| | | | | 361/52 |
| 2011/0187184 | A1* | 8/2011 | Ichikawa | B60L 1/003 |
| | | | | 307/10.1 |
| 2012/0123625 | A1* | 5/2012 | Ueo | B60L 3/003 |
| | | | | 701/22 |
| 2012/0256589 | A1* | 10/2012 | Ichikawa | B60L 11/1803 |
| | | | | 320/111 |
| 2012/0319648 | A1 | 12/2012 | Ohtomo | |
| 2013/0082663 | A1 | 4/2013 | Mori et al. | |
| 2013/0249491 | A1* | 9/2013 | Suzuki | H02J 7/0014 |
| | | | | 320/126 |
| 2013/0257375 | A1* | 10/2013 | Ang | H02J 7/022 |
| | | | | 320/109 |
| 2013/0264867 | A1* | 10/2013 | Mitsutani | B60L 1/003 |
| | | | | 307/10.1 |
| 2013/0320986 | A1* | 12/2013 | Shiraishi | G01R 31/327 |
| | | | | 324/415 |
| 2014/0111120 | A1* | 4/2014 | Mitsutani | B60L 11/18 |
| | | | | 318/139 |
| 2014/0239894 | A1* | 8/2014 | Mitsutani | H02J 7/04 |
| | | | | 320/109 |
| 2014/0327408 | A1* | 11/2014 | Ishii | B60L 11/123 |
| | | | | 320/135 |

* cited by examiner

FIG.3

| | RELAY NORMAL |
| DIAGNOSIS NORMALLY TERMINATED | BOTH POLE FIXATION |
| | PARTIALLY ABNORMAL (ONE POLE FIXATION, SENSOR ABNORMALITY, OR THE LIKE) |
| DIAGNOSIS ABNORMALITY OR THE LIKE | DIAGNOSIS INCOMPLETE (NO MEMORY STORAGE) |

F I G . 4

| LID STATE | | RELAY WELDING DIAGNOSIS RESULT | | |
|---|---|---|---|---|
| | | NORMAL | PARTIALLY ABNORMAL | BOTH POLE FIXATION |
| | CLOSED | TRAVELING PERMITTED | TRAVELING PERMITTED | TRAVELING NOT PERMITTED (PROHIBITED) |
| | OPEN OR INDEFINITE | TRAVELING PERMITTED | TRAVELING NOT PERMITTED (STAND-BY) | TRAVELING NOT PERMITTED (PROHIBITED) |

FIG. 9

| LID STATE | | RELAY WELDING DIAGNOSIS RESULT | | | |
|---|---|---|---|---|---|
| | | NORMAL | PARTIALLY ABNORMAL | BOTH POLE FIXATION | DIAGNOSIS INCOMPLETE |
| | CLOSED | TRAVELING PERMITTED | TRAVELING PERMITTED | TRAVELING NOT PERMITTED (PROHIBITED) | RELAY WELDING DIAGNOSIS REQUEST |
| | OPEN OR INDEFINITE | TRAVELING PERMITTED | TRAVELING NOT PERMITTED (STAND-BY) | TRAVELING NOT PERMITTED (PROHIBITED) | TRAVELING NOT PERMITTED (STAND-BY) |

VEHICLE AND CONTROL METHOD FOR VEHICLE

BACKGROUND OF THE INVENTION

1. Field of the Invention

The invention relates to a vehicle and a control method for a vehicle and, more particularly, to a vehicle capable of outputting electric power of an electric power supply mounted on the vehicle to an external load or receiving electric power for charging the electric power supply mounted on the vehicle from an external electric power supply and a control method for a vehicle.

2. Description of Related Art

A vehicle in which electric power can be exchanged between an electrical load outside the vehicle or an electrical load brought into the vehicle (hereinafter, these electrical loads will be collectively referred to as an "external load") or an electric power supply outside the vehicle (external electric power supply) and a DC electric power supply (electric power supply mounted on the vehicle) mounted on the vehicle is known.

For example, Japanese Patent Application Publication No. 2012-70577 (JP 2012-70577 A) discloses a discharging system that is capable of outputting DC electric power outside from a battery of the electric power supply mounted on the vehicle. In this discharging system, a switch (interlock relay) for preventing the voltage of the electric power supply mounted on the vehicle from being output by mistake to an external terminal is disposed on an electric power line between the battery and the external terminal (connector) to which the external load is electrically connected (refer to JP 2012-70577 A).

When switch welding (fixation in a conducting state) occurs in the switch described above, the voltage of the electric power supply mounted on the vehicle can be unintentionally applied to the external terminal. In general, welding diagnosis is performed so as to determine the presence or absence of the switch welding.

It is desirable that traveling is permitted, even if the switch welding is detected by the welding diagnosis, if safety of the external terminal is ensured. If the traveling is not permitted in every case where the result of the welding diagnosis is abnormal, the traveling may be prohibited even in a case where it can be determined that the vehicle is able to travel and the safety ensured by other means. In JP 2012-70577 A described above, a relationship between a welding abnormality of the interlock relay and determination whether to permit the vehicle to travel is not particularly studied.

SUMMARY OF THE INVENTION

According to the invention, traveling of a vehicle is permitted to the maximum extent, while safety of an external terminal is ensured in the vehicle that is capable of outputting electric power of an electric power supply mounted on the vehicle to an external load or receiving electric power for charging the electric power from an external electric power supply.

A vehicle relate to the present invention comprises an electric power supply, an external terminal, a lid, a switch, and an electronic control unit. The external terminal is configured to be capable of outputting electric power of the electric power supply to an external load. The external terminal is configured to be capable of being input electric power for charging the electric power supply from an external electric power supply. The lid is disposed in the external terminal. The switch is disposed at an electric circuit between the external terminal and the electric power supply. The electronic control unit is configured to control the switch. The electronic control unit is configured to close the switch while the output or the input of the electric power is performed through the external terminal. The electronic control unit is configured to open the switch during traveling. The electronic control unit is configured to execute welding diagnosis for the switch. The electronic control unit is configured to determine whether to permit the vehicle to travel based on a result of the welding diagnosis and an open-closed state of the lid.

In this vehicle, whether to permit the vehicle to travel is determined based on the result of the welding diagnosis for the switch and the open-closed state of the lid disposed in the external terminal. Accordingly, even in a case where the result of the welding diagnosis is abnormal, the traveling can be permitted in a case where safety can be ensured by the lid being in a closed state. Accordingly, the traveling of the vehicle is permitted to the maximum extent while the safety of the external terminal is ensured according to this vehicle.

The electronic control unit may be configured to execute the welding diagnosis after the termination of the output or the input of the electric power through the external terminal, and the electronic control unit may be configured to determine whether to permit the vehicle to travel based on the result of the welding diagnosis and the open-closed state of the lid, when the electronic control unit receives a start request for a traveling system of the vehicle.

Basically, in this vehicle, the welding diagnosis does not have to be executed when the start request for the traveling system is received. Accordingly, the determination whether to permit the vehicle to travel, at a time when the start request for the traveling system is received, can be expedited.

Further, the electronic control unit may be configured to re-execute the welding diagnosis, on a condition that the result of the welding diagnosis shows diagnosis incomplete when the electronic control unit receives the start request, and t he electronic control unit may be configured to determine whether to permit the vehicle to travel based on a result of the re-execution of the welding diagnosis and the open-closed state of the lid.

In this vehicle, the result of the welding diagnosis is confirmed by re-executing the welding diagnosis when the result of the welding diagnosis for the switch shows diagnosis incomplete. Accordingly, the determination whether to permit the vehicle to travel can be reliably executed based on the result of the welding diagnosis and the open-closed state of the lid according to this vehicle.

Further, the electronic control unit may be configured to re-execute the welding diagnosis, on a condition that the lid is in a closed state, and the result of the welding diagnosis shows the diagnosis incomplete when the electronic control unit receives the stat request.

In a case where the welding diagnosis is to be re-executed, both poles of the switch may already be welded. According to this vehicle, however, the welding diagnosis is executed on condition that the lid disposed in the external terminal is in the closed state, and thus the safety can be further enhanced.

The electronic control unit may be configured to determine that the traveling can be permitted, on a condition that the lid is in a closed state and the result of the welding diagnosis shows a one pole welding abnormality of the switch.

Even if the result of the welding diagnosis shows the one pole welding abnormality, the switch has a cut-off function although incomplete. According to this vehicle, the safety of the external terminal can be sufficiently ensured and the traveling of the vehicle can be permitted if the lid is in the closed state.

The electronic control unit may be configured to determine that the traveling can be permitted, on a condition that the lid is in an open state or an indefinite state and the result of the welding diagnosis shows normal.

When the result of the welding diagnosis shows the normal, the safety of the external terminal is sufficiently ensured. According to this vehicle, the vehicle is permitted to travel, even if the lid is not in the closed state, when the result of the welding diagnosis shows the normal.

A control method related to the present invention is for a vehicle. The vehicle includes an electric power supply, an external terminal, a lid, a switch, and an electronic control unit. The external terminal is configured to be capable of outputting electric power of the electric power supply to an external load. The external terminal is configured to be capable of being input electric power for charging the electric power supply from an external electronic power supply. The lid is disposed in the external terminal. The switch is disposed at an electric circuit between the external terminal and the electric power supply. The switch is configured to be closed while the output or the input of the electric power is performed through the external terminal, and the switch is configured to be opened during traveling. The control method includes: executing, by the electronic control unit, welding diagnosis for the switch; detecting, by the electronic control unit, an open-closed state of the lid; and determining, by the electronic control unit, whether to permit the vehicle to travel based on the result of a welding diagnosis and the open-closed state of the lid.

In this control method, whether to permit the vehicle to travel is determined based on the result of the welding diagnosis for the switch and the open-closed state of the lid disposed in the external terminal. In a case where safety can be ensured by the lid being in a closed state, the traveling can be permitted even in a case where the result of the welding diagnosis is abnormal. Accordingly, the traveling of the vehicle is permitted to the maximum extent while the safety of the external terminal is ensured according to this control method.

According to the invention, traveling of a vehicle is permitted to the maximum extent while safety of an external terminal is ensured in the vehicle capable of outputting electric power of an electric power supply mounted on the vehicle to an external load or receiving electric power for charging the electric power supply mounted on the vehicle from an external electric power supply.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3 is a diagram illustrating the result of diagnosis by a relay welding diagnosis unit;

FIG. 4 is a diagram illustrating determination whether to permit the vehicle to travel by a determination unit;

FIG. 9 is a diagram illustrating determination whether to permit the vehicle to travel by a determination unit according to the second embodiment;

DETAILED DESCRIPTION OF EMBODIMENTS

Figure 1:
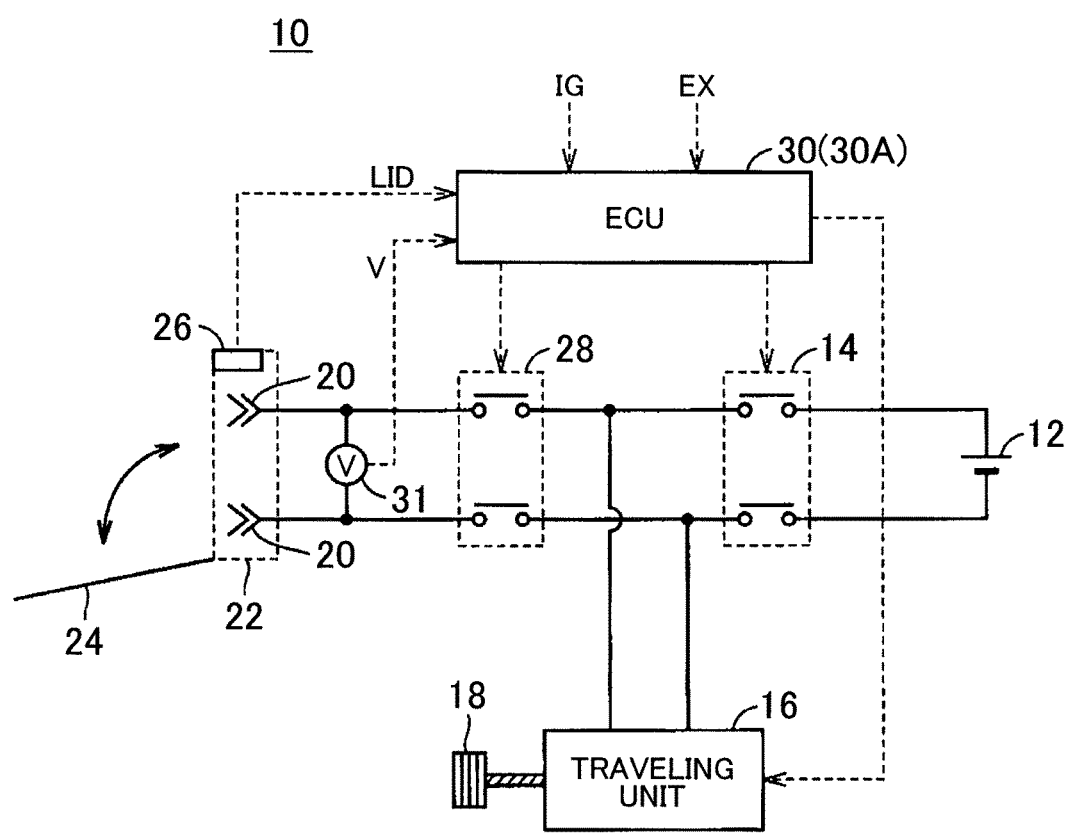
FIG. 1 is a schematic configuration diagram of a vehicle according to a first embodiment of the invention.

Hereinafter, embodiments of the invention will be described in detail with reference to the accompanying drawings. Like reference numerals will be used to refer to like elements in the drawings and description thereof will not be repeated.

FIG. 1 is a schematic configuration diagram of a vehicle 10 according to a first embodiment of the invention. Referring to FIG. 1, the vehicle 10 is provided with a DC electric power supply 12, a system main relay (SMR) 14, a traveling unit 16, and a driving wheel 18. In addition, the vehicle 10 is provided with an external terminal 20, a storage unit 22, a lid 24, an open-closed detection sensor 26, a relay 28, an electronic control unit (ECU) 30, and a voltage sensor 31.

The DC electric power supply 12 is a rechargeable electric power storage device. A secondary battery such as a lithium-ion or nickel-hydrogen battery constitutes the DC electric power supply 12. Electric power that is stored in the DC electric power supply 12 can be supplied to the traveling unit 16 and an external load (not illustrated, same applied below) connected to the external terminal 20 (in the following description, electric power feeding from the DC electric power supply 12 to the external load connected to the external terminal 20 will be referred to as "external electric power feeding"). In addition, the DC electric power supply 12 can store electric power that is generated during braking or the like in the traveling unit 16.

The SMR 14 is disposed between the DC electric power supply 12 and the traveling unit 16. The SMR 14 is turned ON by the ECU 30 when the vehicle 10 travels. In addition, the SMR 14 is turned ON by the ECU 30 during the external electric power feeding and during the execution of welding diagnosis processing (described later) for the relay 28.

The traveling unit 16 generates a driving force for traveling by driving the driving wheel 18. Although not illustrated, the traveling unit 16 includes a converter and an inverter to which electric power is supplied from the DC electric power supply 12, a motor that is driven by the inverter and drives the driving wheel 18, and the like. The traveling unit 16 may include an electric power generator that generates electric power for charging the DC electric power supply 12 and an engine that is capable of driving the electric power generator.

The external terminal 20 is a terminal for outputting the electric power that is stored in the DC electric power supply 12 to the external load. The external terminal 20 is configured to be electrically connectable to the external load. The external terminal 20 is not particularly limited in configuration. The external terminal 20 may be a connector or may be a plug. In addition, a place where the external terminal 20 is installed is not particularly limited. The external terminal 20 may be installed in a body or may be installed in a passenger compartment. In other words, the external load may be used outside the vehicle or may be used in the passenger compartment.

The lid 24 is disposed in the external terminal 20 and the lid 24 is able to open and close. Specifically, the external terminal 20 is stored in the storage unit 22, and the storage unit 22 can be opened and closed by the lid 24. The open-closed detection sensor 26 is a sensor for detecting an open-closed state of the lid 24 and outputs a signal LID showing the open-closed state of the lid 24 to the ECU 30.

The relay 28 is disposed at an electric circuit between the external terminal 20 and the DC electric power supply 12. In the first embodiment, the external terminal 20 is configured to be connectable to the electric circuit more on the traveling unit 16 side than on the SMR 14 and the relay 28 is disposed between the external terminal 20 and the SMR 14 and the traveling unit 16. However, the external terminal 20 may also be connectable to the DC electric power supply 12 via the relay 28. The relay 28 is turned ON by the ECU 30 during the external electric power feeding and is turned OFF by the ECU 30 during the traveling. In addition, the welding diagnosis processing (described later) for the relay 28 is executed by the ECU 30 after the termination of the external electric power feeding.

The voltage sensor 31 detects a voltage V between a pair of electric power lines between the external terminal 20 and the relay 28 and outputs the result of the detection to the ECU 30.

The ECU 30 includes a central processing unit (CPU), a memory, an I/O buffer, and the like (none of which is illustrated) and performs various types of control for the vehicle 10. As a representative example, the ECU 30 turns ON the SMR 14 and the relay 28 and allows the external electric power feeding from the external terminal 20 to be executed (external electric power feeding mode) when a signal EX showing an external electric power feeding execution request is received. In addition, the ECU 30 executes the welding diagnosis processing for the relay 28 when the external electric power feeding is terminated. In addition, the ECU 30 determines whether to permit the vehicle 10 to travel based on the result of welding diagnosis for the relay 28 and the open-closed state of the lid 24 based on the signal LID when an ignition key (may be a switch as well) is ON and a signal IG showing a start request for a traveling system including the traveling unit 16 is received. After the vehicle 10 is permitted to travel, the ECU 30 executes traveling control for the vehicle 10 (traveling mode).

As illustrated in FIG. 1, the relay 28 and the SMR 14 are disposed at the electric circuit between the external terminal 20 and the DC electric power supply 12 in the vehicle 10, and the voltage of the DC electric power supply 12 can be applied to the external terminal 20 when the relay 28 is in a conductive state during the traveling with the SMR 14 ON. In the vehicle 10, the welding diagnosis for the relay 28 is executed so as to ensure the safety of the external terminal 20. This welding diagnosis is executed after the termination of the external electric power feeding using the external terminal 20.

If the traveling is not permitted in every case where any abnormality is detected as the result of the welding diagnosis, the traveling is prohibited even in a case where it can be determined that the vehicle 10 is able to travel and the safety ensured by other means. In this case, a traveling opportunity may be limited. In the vehicle 10 according to the first embodiment, the lid 24 is disposed in the external terminal 20, and the traveling is permitted, even in a case where an abnormality is detected in the welding diagnosis for the relay 28, in a case where the safety of the external terminal 20 can be ensured with the lid 24 closed. In other words, in this vehicle 10, whether to permit the vehicle 10 to travel is determined based on the result of the welding diagnosis for the relay 28 and the open-closed state of the lid 24 rather than based solely on the result of the welding diagnosis for the relay 28. Accordingly, any excessive limitation on the traveling opportunity can be suppressed. Hereinafter, this will be described in detail.

Figure 2:
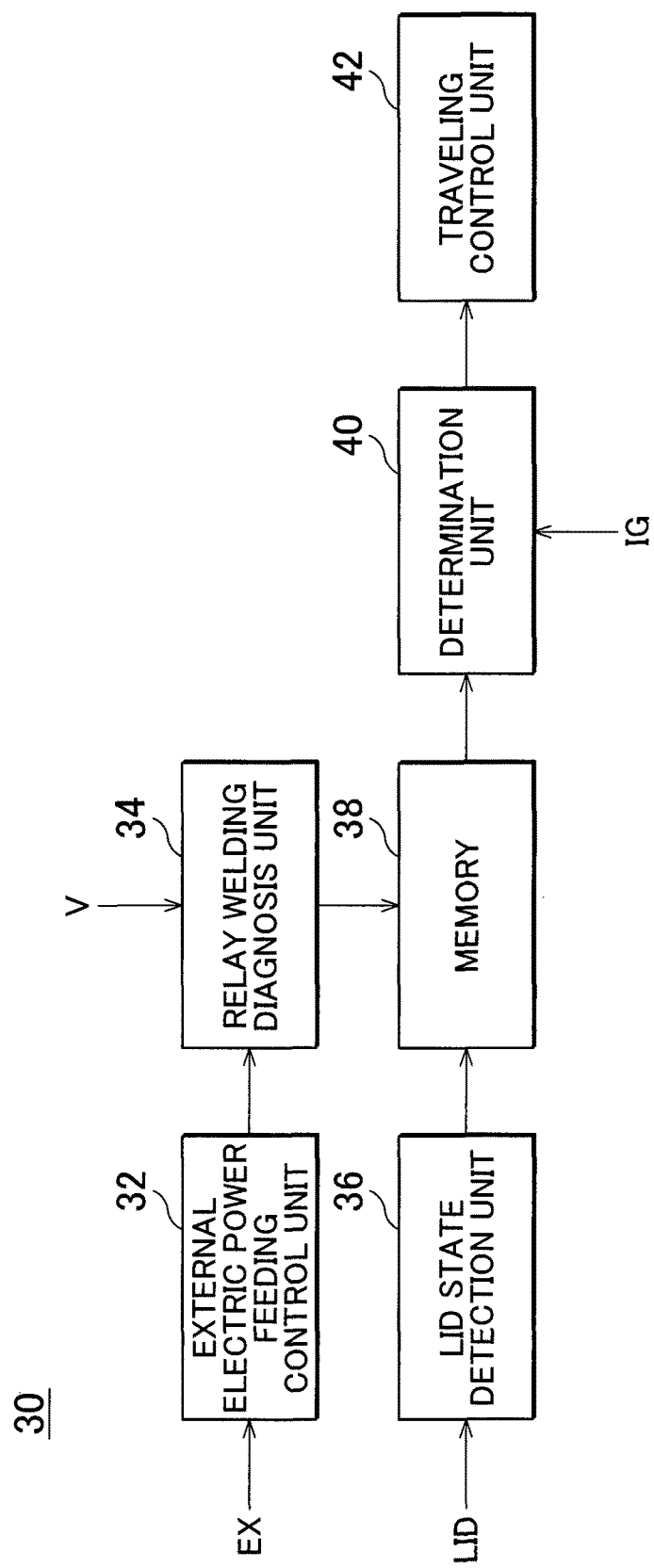
FIG. 2 is a functional block diagram illustrating a detailed configuration of an ECU that is illustrated in FIG. 1.

FIG. 2 is a functional block diagram illustrating a detailed configuration of the ECU 30 that is illustrated in FIG. 1. Referring to FIG. 2, the ECU 30 includes an external electric power feeding control unit 32, a relay welding diagnosis unit 34, a lid state detection unit 36, a memory 38, a determination unit 40, and a traveling control unit 42.

The external electric power feeding control unit 32 puts the vehicle 10 into the external electric power feeding mode when the signal EX showing the external electric power feeding execution request is received. Then, the external load is connected to the external terminal 20 (FIG. 1), and the external electric power feeding control unit 32 turns ON the SMR 14 and the relay 28 (FIG. 1) when a predetermined execution condition is satisfied. When the termination of the external electric power feeding is detected with the external load removed from the external terminal 20, the signal EX not input, or the like, the external electric power feeding control unit 32 notifies the relay welding diagnosis unit 34 of the termination of the external electric power feeding.

When the notification of the termination of the external electric power feeding is received from the external electric power feeding control unit 32, the relay welding diagnosis unit 34 executes the welding diagnosis processing for the relay 28. As an example, the relay welding diagnosis unit 34 turns ON the relay 28 part by part in a state where the SMR 14 is ON. When the voltage V corresponding to the voltage of the DC electric power supply 12 is detected by the voltage sensor 31, the relay welding diagnosis unit 34 determines that the relay on the side where an OFF command is output is welded (fixed in the ON state).

FIG. 3 is a diagram illustrating the result of the diagnosis by the relay welding diagnosis unit 34. Referring to FIG. 3, the result of the diagnosis by the relay welding diagnosis unit 34 is any one of "relay normal", "both pole fixation", "partially abnormal", and "diagnosis incomplete". The "relay normal" (hereinafter, simply referred to as "normal") is a diagnosis result in a case where both poles of the relay 28 are determined not to be welded. The "both pole fixation" is a diagnosis result in a case where both poles of the relay 28 are determined to be welded (fixed in the conductive state). The "partially abnormal" is, basically, a diagnosis result in a case where only one pole of the relay 28 is determined to be welded. Herein, however, the "partially abnormal" also includes a case where another abnormality (except for the both pole fixation) such as an abnormality of the voltage sensor 31 (FIG. 1) is detected. The "diagnosis incomplete" corresponds, for example, to a case where the welding diagnosis processing is not terminated within a predetermined period of time due to any abnormality and a case where the welding diagnosis is not executed because of an abnormal termination of the external electric power feeding (for example, in the case of an emergency stop due to the flow of an over-rated current or the like).

In a case where the welding diagnosis is normally terminated, any one of the "normal", the "both pole fixation", and the "partially abnormal" is stored in the memory 38 (FIG. 2) as the diagnosis result. In a case where the diagnosis result is the "diagnosis incomplete" due to a diagnosis abnormality or the like, the diagnosis result is not stored in the memory 38.

Referring back to FIG. 2, the lid state detection unit 36 detects the state of the lid 24 (FIG. 1) based on the signal LID received from the open-closed detection sensor 26 (FIG. 1). The result of the detection of the state of the lid 24 by the lid state detection unit 36 is any one of "open", "closed", and "indefinite". The "indefinite" corresponds to a case where the state of the lid 24 cannot be confirmed due to an abnormality of the open-closed detection sensor 26 or the like. The lid state detection unit 36 stores the result of the detection of the state of the lid 24 in the memory 38.

The memory 38 stores the diagnosis result from the relay welding diagnosis unit 34 and the detection result from the lid state detection unit 36. A static random access memory (SRAM), for example, can constitute the memory 38. A readable and writable non-volatile electrically erasable programmable read-only memory (EEPROM) or the like may constitute the memory 38 along with the SRAM or instead of the SRAM.

When the signal IG showing the start request for the traveling system including the traveling unit 16 (FIG. 1) is received, the determination unit 40 reads the result of the diagnosis by the relay welding diagnosis unit 34 and the result of the detection by the lid state detection unit 36 from the memory 38. Then, the determination unit 40 determines whether to permit the vehicle 10 to travel based on the result of the welding diagnosis for the relay 28 and the open-closed state of the lid 24 read from the memory 38.

FIG. 4 is a diagram illustrating the determination whether to permit the vehicle 10 to travel by the determination unit 40. Referring to FIG. 4, the determination unit 40 permits the vehicle 10 to travel in a case where the welding diagnosis result for the relay 28 is the "normal" and the state of the lid 24 is the "closed". In a case where the welding diagnosis result is the "normal" and the state of the lid 24 is the "open" or the "indefinite", the determination unit 40 permits the vehicle 10 to travel. In other words, the safety of the external terminal 20 is ensured, even if the state of the lid 24 is the "open" or the "indefinite", in a case where the result of the welding diagnosis for the relay 28 is the "normal", and thus the vehicle 10 is permitted to travel.

In a case where the welding diagnosis result for the relay 28 is the "partially abnormal" and the state of the lid 24 is the "closed", the determination unit 40 permits the vehicle 10 to travel. In a case where the welding diagnosis result is the "partially abnormal" and the state of the lid 24 is the "open" or the "indefinite", the determination unit 40 does not permit (stands by) the vehicle 10 to travel. The "partially abnormal" does not include the "both pole fixation", and thus the safety of the external terminal 20 is ensured and the vehicle 10 is permitted to travel, despite the detection of an abnormality such as one pole fixation, if the lid 24 is closed.

In a case where the welding diagnosis result for the relay 28 is the "both pole fixation" and the state of the lid 24 is the "closed", the determination unit 40 does not permit (prohibits) the vehicle 10 to travel. In addition, the determination unit 40 does not permit (prohibits) the vehicle 10 to travel even in a case where the welding diagnosis result is the "both pole fixation" and the state of the lid 24 is the "open" or the "indefinite". In other words, in a case where the result of the welding diagnosis for the relay 28 is the "both pole fixation", the voltage of the DC electric power supply 12 is applied to the external terminal 20 when the SMR 14 (FIG. 1) is turned ON as a result of the start of the traveling system, and thus the traveling of the vehicle 10 is not permitted.

Referring back to FIG. 2, the traveling control unit 42 turns ON the SMR 14 and controls the traveling of the vehicle 10 by the traveling unit 16 (FIG. 1) after the traveling of the vehicle 10 is permitted by the determination unit 40.

In this vehicle 10, whether to permit the vehicle 10 to travel is determined based on the result of the welding diagnosis for the relay 28 and the open-closed state of the lid 24 as described above. Hereinafter, a procedure of processing associated with the determination whether to permit the vehicle 10 to travel which executed by the ECU 30 will be described with reference to the flowcharts illustrated in FIGS. 5 to 7.

Figure 5:
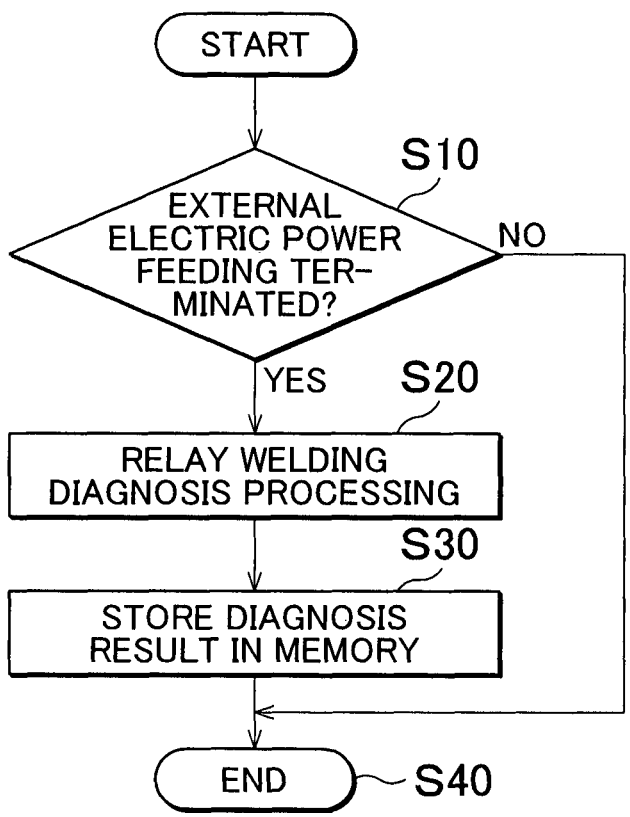
FIG. 5 is a flowchart showing processing that is executed by the ECU after the termination of external electric power feeding.

FIG. 5 is a flowchart showing the processing that is executed by the ECU 30 after the termination of the external electric power feeding. The processing that is illustrated in this flowchart is repeatedly executed in the external electric power feeding mode. Referring to FIG. 5, the ECU 30 determines whether or not the external electric power feeding is terminated (Step S10).

If it is determined that the external electric power feeding is terminated (YES in Step S10), the ECU 30 executes the welding diagnosis processing for the relay 28 (Step S20) by using the method described above. Then, the ECU 30 stores the result of the welding diagnosis (any one of the "normal", the "both pole fixation", and the "partially abnormal") in the memory 38 (Step S30). In a case where the welding diagnosis processing is not terminated within a predetermined period of time due to any abnormality and in a case where the termination of the external electric power feeding is not detected due to an abnormality of the external electric power feeding, the diagnosis result is not stored in the memory 38 (diagnosis result indefinite).

Figure 6:
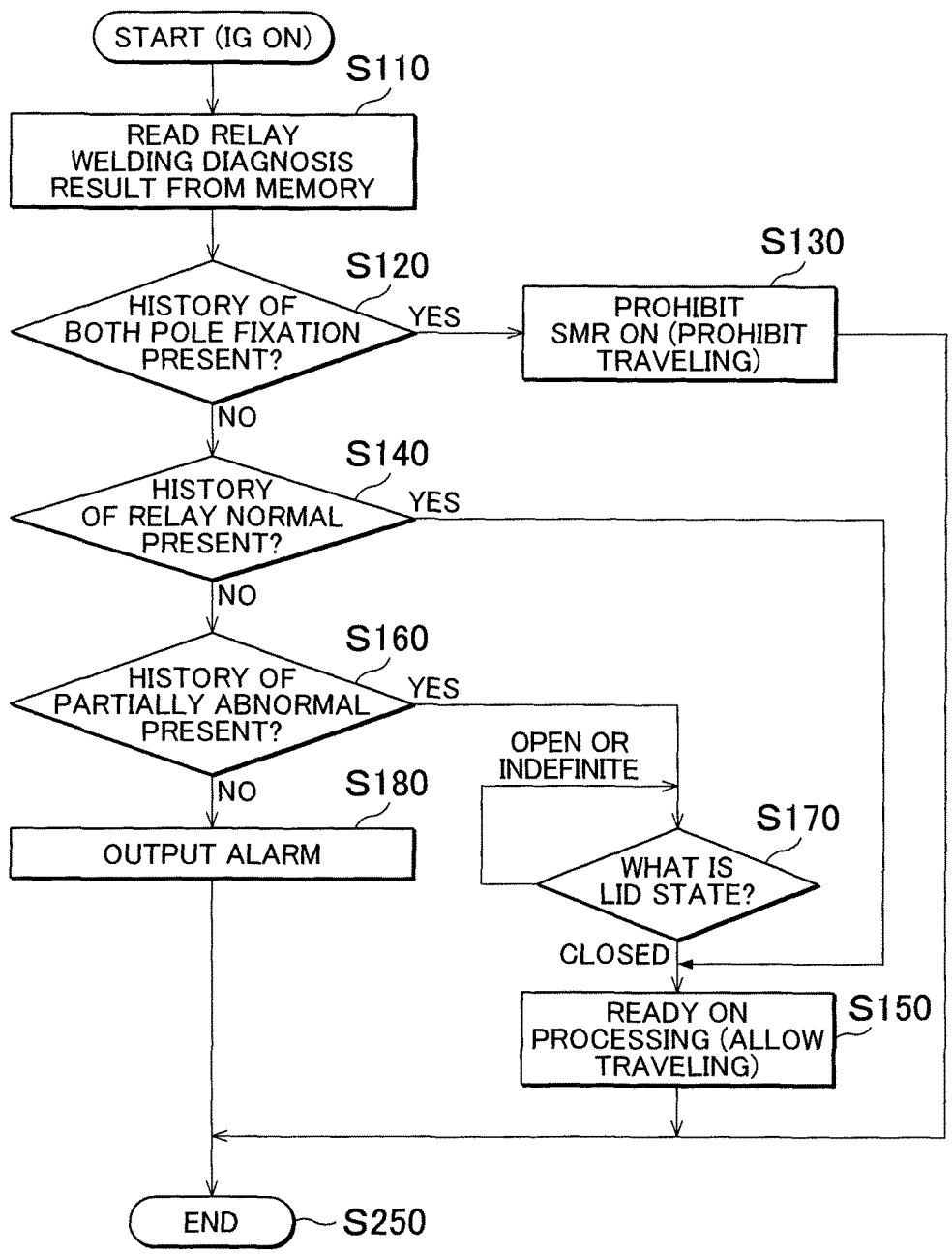
FIG. 6 is a flowchart showing a processing procedure of the determination whether to permit the vehicle to travel which executed by the ECU during the start of a traveling system.

FIG. 6 is a flowchart showing a processing procedure of the determination whether to permit the vehicle 10 to travel which executed by the ECU 30 during the start of the traveling system. The processing that is illustrated in this flowchart is executed after the ECU 30 receives the signal IG showing the start of the traveling system.

Referring to FIG. 6, the ECU 30 reads the welding diagnosis result for the relay 28 (Step S110) from the memory 38 (FIG. 2) after the signal IG is received. Then, the ECU 30 determines whether or not the welding diagnosis result read from the memory 38 shows the "both pole fixation" (Step S120). If it is determined that the welding diagnosis result shows the "both pole fixation" (YES in Step S120), the ECU 30 prohibits the SMR 14 from being turned ON (Step S130). In other words, the traveling of the vehicle 10 is not permitted and the traveling of the vehicle 10 is prohibited. Then, the ECU 30 allows the processing to proceed to Step S250.

In a case where it is determined in Step S120 that the history of both pole fixation is absent(NO in Step S120), the ECU 30 determines whether or not the welding diagnosis result read from the memory 38 shows the "normal" (Step S140). If it is determined that the welding diagnosis result shows the "normal" (YES in Step S140), the ECU 30 allows the processing to proceed to Step S150 and executes ready-ON processing so as to start the traveling system (Step S150). The traveling of the vehicle 10 is permitted by the ready-ON processing. The SMR 14 is turned ON (the relay 28 being OFF) by the ready-ON processing and the traveling unit 16 is put into an operable state.

In a case where it is determined in Step S140 that the history of relay normal is absent (NO in Step S140), the ECU 30 determines whether or not the welding diagnosis result read from the memory 38 shows the "partially abnormal" (Step S160). As described above, the one pole fixation of the relay 28 is included in the "partially abnormal". If it is determined that the welding diagnosis result shows the "partially abnormal" (YES in Step S160), the ECU 30 determines the state of the lid 24 (Step S170) based on the signal LID received from the open-closed detection sensor 26 (FIG. 1).

If it is determined that the lid 24 is in a closed state ("closed" in Step S170), the ECU 30 allows the processing to proceed to Step S150 and the ready-ON processing is executed. In other words, the traveling of the vehicle 10 is permitted. In a case where it is determined that the lid 24 is in an open state or an indefinite state ("open" or "indefinite" in Step S170), the ECU 30 does not allow the processing to proceed to Step S150. In other words, the traveling of the vehicle 10 is not permitted and the vehicle 10 is in a stand-by state until the lid 24 is closed.

In a case where it is determined in Step S160 that a history of "partially abnormal" is also absent (NO in Step S160), the welding diagnosis is determined to be the "diagnosis incomplete". A case where the welding diagnosis is incomplete includes both of the poles of the relay 28 being fixed, and thus the ECU 30 outputs an alarm (Step S180), and then allows the processing to proceed to Step S250. In other words, in the first embodiment, the traveling of the vehicle 10 is not permitted in a case where the result of the welding diagnosis shows the "diagnosis incomplete".

Figure 7:
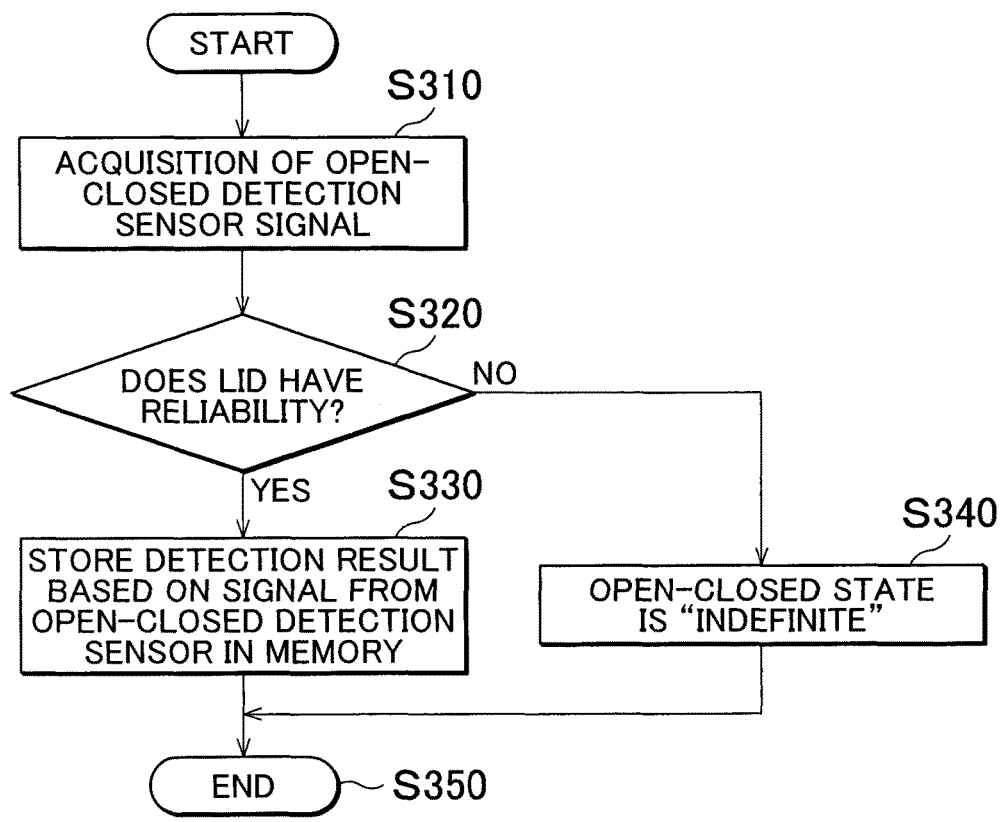
FIG. 7 is a flowchart showing a processing procedure of state detection for a lid that is executed by the ECU.

FIG. 7 is a flowchart showing a processing procedure of state detection for the lid 24 that is executed by the ECU 30. The processing that is illustrated in this flowchart is repeatedly executed while the ECU 30 is started.

Referring to FIG. 7, the ECU 30 acquires the signal LID (Step S310) that is output from the open-closed detection sensor 26 (FIG. 1). Then, the ECU 30 determines the presence or absence of reliability of the lid 24 (Step S320). The reliability of the lid 24 can be determined from various criteria. It is determined that the lid 24 lacks reliability when, for example, the signal LID is not output from the lid 24 and when an abnormality is recognized in the signal level of the signal LID.

If it is determined in Step S320 that the lid 24 has reliability (YES in Step S320), the ECU 30 stores the result of the detection of the open-closed state of the lid 24 ("open" or "closed") in the memory 38 (FIG. 2) based on the acquired signal LID (Step S330). In a case where it is determined that the lid 24 lacks reliability (NO in Step S320), the ECU 30 sets the open-closed state of the lid 24 to the "indefinite" (Step S340). The open-closed state of the lid 24 being the "indefinite" is also stored in the memory 38.

In the first embodiment, whether to permit the vehicle 10 to travel is determined based on the result of the welding diagnosis for the relay 28 and the open-closed state of the lid 24 disposed in the external terminal 20 as described above. Accordingly, even in a case where the result of the welding diagnosis is not normal, the traveling can be permitted in a case where the safety can be ensured by the lid 24 being in the closed state. Accordingly, the traveling of the vehicle 10 is permitted to the maximum extent possible while the safety of the external terminal 20 is ensured according to the first embodiment.

In the first embodiment, the safety of the external terminal 20 can be ensured and the vehicle 10 can be permitted to travel if the lid 24 is in the closed state in a case where the diagnosis result is a one pole fixation abnormality. In addition, in a case where the diagnosis result is normal, the safety of the external terminal 20 is ensured by the relay 28 being turned OFF, and thus the vehicle 10 can be permitted to travel even if the lid 24 is not in the closed state.

In a second embodiment, the welding diagnosis for the relay 28 is re-executed when the welding diagnosis for the relay 28 shows the "diagnosis incomplete" in a case where the ECU 30 receives the signal IG showing the start of the traveling system and determines whether to permit the vehicle 10 to travel. Then, whether to permit the vehicle 10 to travel is determined based on the result of the re-executed welding diagnosis and the open-closed state of the lid 24. In this manner, the welding diagnosis result for the relay 28 is confirmed during the start request for the traveling system and whether to permit the vehicle 10 to travel can be determined even in a case where the result of the welding diagnosis shows the "diagnosis incomplete".

Compared to the configuration of the vehicle 10 according to the first embodiment that is illustrated in FIG. 1, the vehicle 10 according to the second embodiment is provided with an ECU 30A instead of the ECU 30.

Figure 8:
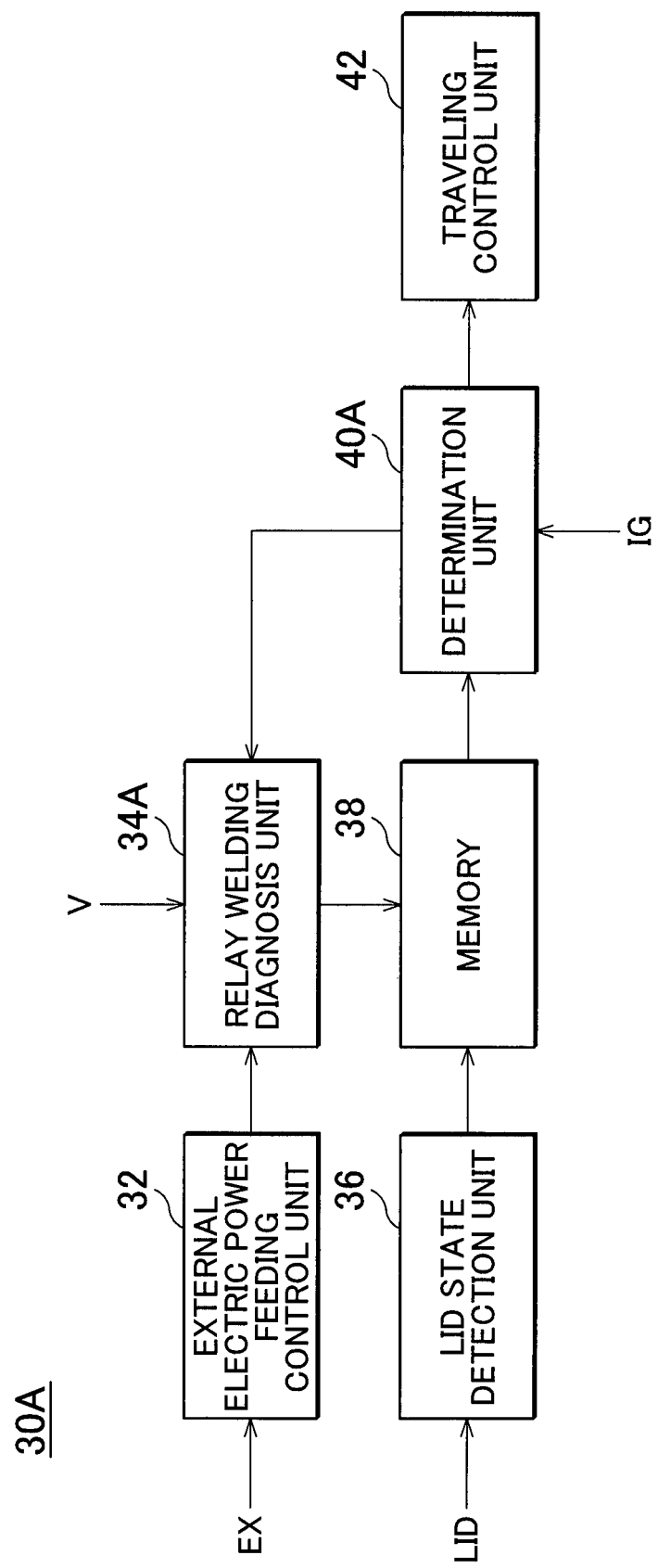
FIG. 8 is a functional block diagram of an ECU according to a second embodiment.

FIG. 8 is a functional block diagram of the ECU 30A according to the second embodiment. Referring to FIG. 8 and compared to the configuration of the ECU 30 according to the first embodiment that is illustrated in FIG. 2, the ECU 30A includes a relay welding diagnosis unit 34A and a determination unit 40A instead of the relay welding diagnosis unit 34 and the determination unit 40, respectively.

When the signal IG showing the start request for the traveling system is received, the determination unit 40A reads the result of the welding diagnosis for the relay 28 and the result of the detection of the open-closed state of the lid 24 from the memory 38. Then, the determination unit 40A determines whether to permit the vehicle 10 to travel based on the result of the welding diagnosis and the open-closed state of the lid 24 read from the memory 38.

In a case where the result of the welding diagnosis read from the memory 38 shows the "diagnosis incomplete", the determination unit 40A outputs a command directing the re-execution of the welding diagnosis to the relay welding diagnosis unit 34A. In the first embodiment described above, the traveling of the vehicle 10 is not permitted in a case where the result of the welding diagnosis shows the "diagnosis incomplete". In the second embodiment, however, the diagnosis result is confirmed by re-executing the welding diagnosis and whether to permit the vehicle 10 to travel is determined based on the diagnosis result. In this case, whether to permit the vehicle 10 to travel can be determined, based on the diagnosis result and the open-closed state of the lid 24, after the diagnosis result is confirmed even in a case where the result of the welding diagnosis executed after the termination of the external electric power feeding shows the "diagnosis incomplete".

FIG. 9 is a diagram illustrating the determination whether to permit the vehicle 10 to travel by determination unit 40A. Referring to FIG. 9, the determination unit 40A requests the execution of the welding diagnosis for the relay 28 to the relay welding diagnosis unit 34A (FIG. 8) in a case where the welding diagnosis result for the relay 28 is the "diagnosis incomplete".

The SMR 14 is ON in a case where the welding diagnosis for the relay 28 is executed, and thus it is preferable that the welding diagnosis is executed on condition that the lid 24 is in the closed state. In the second embodiment, the determination unit 40A requests the execution of the welding diagnosis to the relay welding diagnosis unit 34A in a case where the welding diagnosis result for the relay 28 is the "diagnosis incomplete" and the state of the lid 24 is the "closed". In a case where the welding diagnosis result for the relay 28 is the "diagnosis incomplete" and the state of the lid 24 is the "open" or the "indefinite", the determination unit 40A does not permit (stand-bys) the vehicle 10 to travel. If the lid 24 is closed, the execution of the welding diagnosis is requested to the relay welding diagnosis unit 34A as described above.

In a case where the result of the welding diagnosis is confirmed to be any one of the "normal", the "partially abnormal", and the "both pole fixation" by the re-execution of the welding diagnosis, whether to permit the vehicle 10 to travel can be determined based on the open-closed state of the lid 24. In a case where the welding diagnosis is incomplete despite the re-execution of the welding diagnosis (for, example, in a case where the welding diagnosis is not terminated even after the elapse of a predetermined period of time), the traveling of the vehicle 10 is not permitted (prohibited).

Referring back to FIG. 8, the relay welding diagnosis unit 34A executes the welding diagnosis processing for the relay 28 not only in a case where the notification of the termination of the external electric power feeding is received from the external electric power feeding control unit 32 but also in a case where the request for the execution of the welding diagnosis is received from the determination unit 40A. With regard to the processing for the welding diagnosis, the same as in the relay welding diagnosis unit 34 according to the first embodiment that is illustrated in FIG. 2 is applied.

Figure 10:
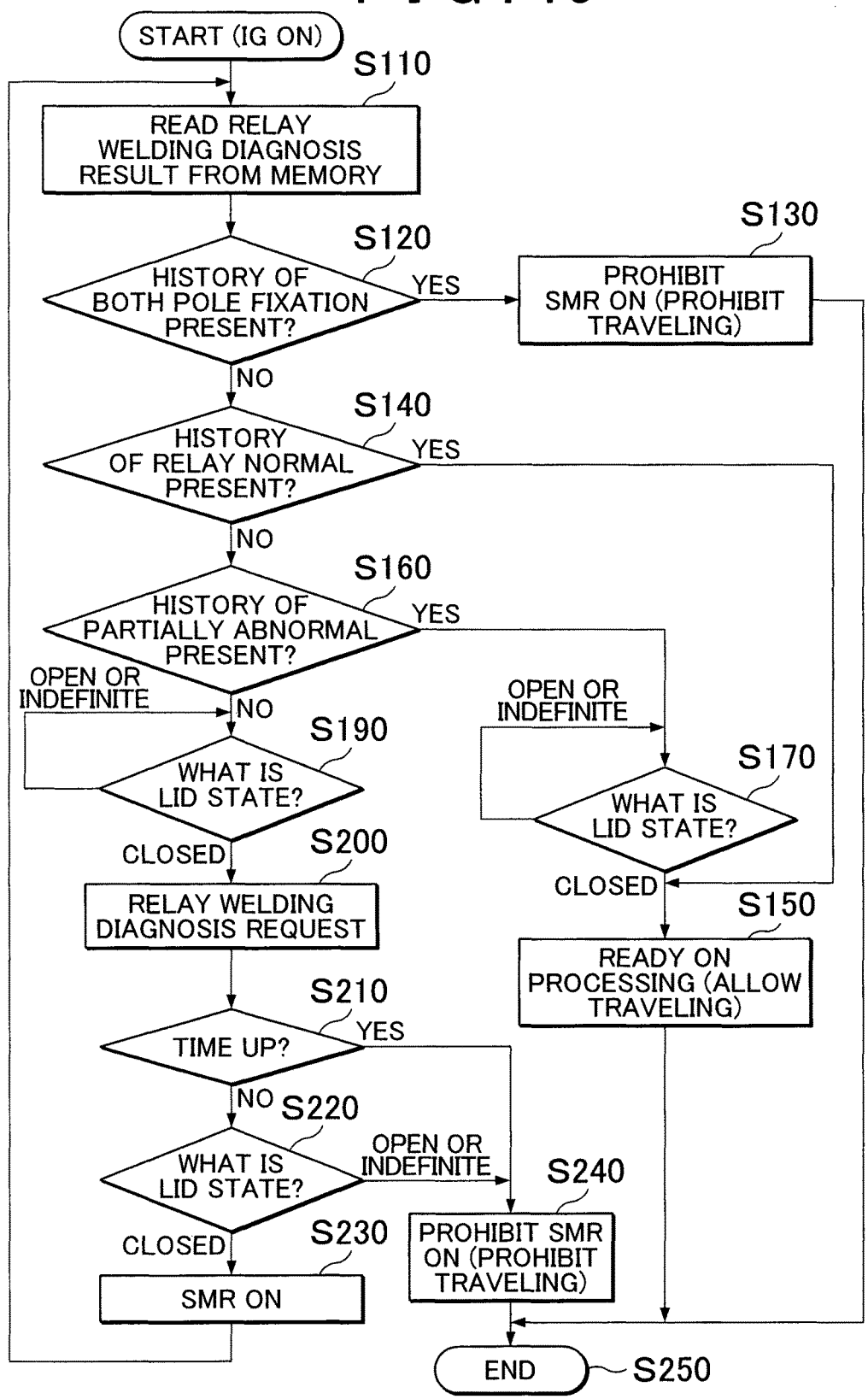
FIG. 10 is a flowchart showing a processing procedure of the determination whether to permit the vehicle to travel which executed by the ECU during the start of a traveling system according to the second embodiment.

FIG. 10 is a flowchart showing a processing procedure of the determination whether to permit the vehicle 10 to travel which executed by the ECU 30A during the start of the traveling system according to the second embodiment. As in the above description, the processing that is illustrated in this flowchart is executed after the signal IG showing the start of the traveling system is received by the ECU 30A.

Referring to FIG. 10 and compared to the flowchart according to the first embodiment that is illustrated in FIG. 6, this flowchart includes Steps S190 to S240 instead of Step S180. In a case where it is determined in Step S160 that the welding diagnosis result does not show the "partially abnormal" (NO in Step S160), that is, in a case where it is determined that the welding diagnosis is the "diagnosis incomplete", the ECU 30A determines the state of the lid 24 (Step S190) based on the signal LID received from the open-closed detection sensor 26 (FIG. 1). If it is determined that the lid 24 is in the closed state ("closed" in Step S190), the ECU 30A requests the welding diagnosis for the relay 28 (Step S200).

Figure 11:
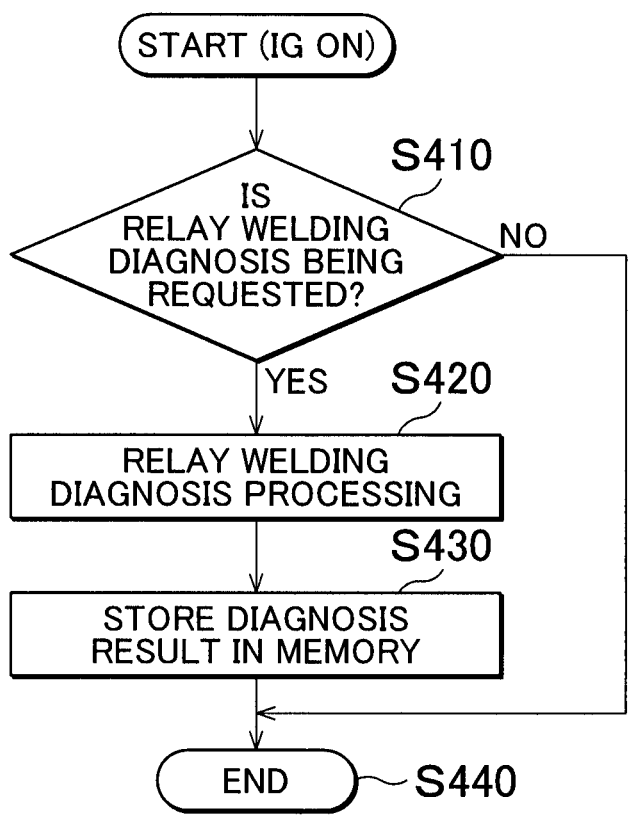
FIG. 11 is a flowchart relating to processing in a case where welding diagnosis for a relay is requested in Step S200 in FIG. 10.

FIG. 11 is a flowchart relating to processing in a case where the welding diagnosis for the relay 28 is requested in Step S200 in FIG. 10. The processing that is illustrated in this flowchart is repeatedly executed while the signal IG showing the start of the traveling system is received by the ECU 30A.

Referring to FIG. 11, the ECU 30A determines whether or not the welding diagnosis for the relay 28 is requested (Step S410). If the welding diagnosis is not requested (NO in Step S410), the ECU 30A allows the processing to proceed to Step S440.

If it is determined in Step 5410 that the welding diagnosis is requested (YES in Step S410), the ECU 30A executes the welding diagnosis processing for the relay 28 (Step S420). The processing for the welding diagnosis is identical to the welding diagnosis that is executed when the external electric power feeding is terminated. The ECU 30A stores the result of the welding diagnosis (any one of the "normal", the "both pole fixation", and the "partially abnormal") in the memory 38 (Step S430).

Referring back to FIG. 10, when the welding diagnosis for the relay 28 is requested in Step S200, the ECU 30A determines whether or not the welding diagnosis processing is timed up (Step S210) by the length of time from the initiation of the welding diagnosis exceeding a predetermined length of time. This processing is to pose a time limit on the welding diagnosis processing in a case where the welding diagnosis is not terminated due to any abnormality.

If it is determined in Step S210 that the welding diagnosis processing is not timed up (NO in Step S210), the ECU 30A determines the state of the lid 24 again based on the signal LID (Step S220). Herein, the state determination for the lid 24 is executed so as to check whether the lid 24 is not the "open" or the "indefinite" after the welding diagnosis for the relay 28 is requested in Step S200. If it is determined that the lid 24 is in the closed state ("closed" in Step S220), the ECU 30A outputs an ON command to the SMR 14 (Step S230) and allows the processing to return to Step S110.

If it is determined in Step S210 that the welding diagnosis processing is timed up (YES in Step S210), the ECU 30A prohibits the SMR 14 from being turned ON (Step S240) considering that the welding diagnosis is not terminated normally. In other words, the traveling of the vehicle 10 is not permitted and the traveling is prohibited. Even in a case where it is determined in Step S220 that the lid 24 is in the open state or the indefinite state ("open" or "indefinite" in Step S220), the processing proceeds to Step S240 and the SMR 14 is prohibited from being turned ON.

In the processing that is illustrated in this flowchart, a series of the processing from Step S110 to Step S230 is repeatedly executed, unless the welding diagnosis processing is timed up, in a case where the welding diagnosis for the relay 28 is requested and the lid 24 is in the closed state in Step S200. Then, the result of the welding diagnosis is determined in Steps S120, S140, or S160 and whether to permit the vehicle 10 to travel is determined if the welding diagnosis result for the relay 28 is stored in the memory 38 by the processing that is illustrated in FIG. 11.

In the second embodiment, the welding diagnosis is re-executed and the result of the welding diagnosis is confirmed as described above when the result of the welding diagnosis for the relay 28 shows the diagnosis incomplete. Accordingly, the determination whether to permit the vehicle 10 to travel can be reliably executed based on the result of the welding diagnosis and the open-closed state of the lid 24 according to the second embodiment.

Basically, the external electric power feeding function assumes the use in an emergency and the interval of the use of the external electric power feeding function is assumed to be long. Accordingly, in a case where abnormalities occur in the welding of the relay 28 and the voltage sensor 31 during the external electric power feeding and the welding diagnosis after the external electric power feeding termination is incomplete, the abnormalities may be left unchecked until the subsequent use of the external electric power feeding after the elapse of a long period of time. However, according to the second embodiment, the welding diagnosis for the relay 28 is re-executed before the initiation of the subsequent traveling in a case where the welding diagnosis after the external electric power feeding termination is incomplete. In this manner, the normality or abnormality of the relay 28 is confirmed, and thus the abnormalities in the welding of the relay 28 and the voltage sensor 31 being left unchecked can be avoided.

In the first and second embodiments described above, the external load is connected to the external terminal 20 and the electric power stored in the DC electric power supply 12 such as the secondary battery can be supplied to the external load (external electric power feeding). The invention, however, can also be applied to a case where electric power that is generated by using an engine and by an electric power generator is DC-converted and supplied from the external terminal 20 to the external load, a case where electric power that is generated by a fuel cell is supplied from the external terminal 20 to the external load, and the like. In addition, the DC electric power supply 12 may be allowed to be charged by using an external electric power supply (external charging) with the external electric power supply (not illustrated) allowed to be connected to the external terminal 20. The invention can be applied to a vehicle allowing at least one of the external electric power feeding and the external charging to be executed by using the external terminal 20.

DC electric power feeding (or DC charging) with no converter or inverter between the DC electric power supply 12 and the external terminal 20 has been described above. However, the invention does not exclude a vehicle in which the converter and the inverter are present between the DC electric power supply 12 and the external terminal 20. In a case where the converter and the inverter are present between the DC electric power supply 12 and the external terminal 20, the DC electric power supply 12 and the external terminal 20 can be electrically cut off from each other by shutting down the converter and the inverter. Accordingly, the invention is suitable for a vehicle allowing the DC electric power feeding (or DC charging) with no converter or inverter between the DC electric power supply 12 and the external terminal 20.

In the above description, the DC electric power supply 12 corresponds to an example of an "electric power supply mounted on a vehicle" according to the invention and the lid 24 corresponds to an example of a "lid" according to the invention. The relay 28 corresponds to an example of a "switch" according to the invention and the ECUs 30, 30A correspond to an example of an "electronic control unit" according to the invention.

The embodiments disclosed herein are expected to be combined with each other as appropriate. It should be noted that the embodiment disclosed herein is exemplary in every aspect and does not limit the invention. The scope of the invention is clarified by the claims, not the description above, and the invention includes any change within the meaning and range equivalent to the claims.

What is claimed is:

1. A vehicle comprising:
   an electric power supply;
   an external terminal configured to be capable of outputting electric power of the electric power supply to an external load, the external terminal being configured to be capable of being input electric power for charging the electric power supply from an external electric power supply;
   a lid disposed in the external terminal;
   a switch disposed at an electric circuit between the external terminal and the electric power supply; and
   an electronic control unit configured to control the switch, the electronic control unit being configured to close the switch while the output or the input of the electric power is performed through the external terminal, the electronic control unit being configured to open the switch during traveling, the electronic control unit being configured to execute welding diagnosis for the switch, and the electronic control unit being configured to determine whether to permit the vehicle to travel based on a result of the welding diagnosis and an open-closed state of the lid,
   wherein the electronic control unit is configured to determine that the traveling can be permitted, on a condition that the lid is in a closed state and the result of the welding diagnosis shows a one pole welding abnormality of the switch.

2. The vehicle according to claim 1,
   wherein the electronic control unit is configured to execute the welding diagnosis after the termination of the output or the input of the electric power through the external terminal, and
   wherein the electronic control unit is configured to determine whether to permit the vehicle to travel based on the result of the welding diagnosis and the open-closed state of the lid, when the electronic control unit receives a start request for a traveling system of the vehicle.

3. The vehicle according to claim 2,
   wherein the electronic control unit is configured to re-execute the welding diagnosis, on a condition that the result of the welding diagnosis shows diagnosis incomplete when the electronic control unit receives the start request, and
   wherein the electronic control unit is configured to determine whether to permit the vehicle to travel based on a result of the re-execution of the welding diagnosis and the open-closed state of the lid.

4. The vehicle according to claim 3,
   wherein the electronic control unit is configured to re-execute the welding diagnosis, on a condition that the lid is in a closed state, and the result of the welding diagnosis shows the diagnosis incomplete when the electronic control unit receives the stat request.

5. The vehicle according to claim 1,
   wherein the electronic control unit is configured to determine that the traveling can be permitted, on a condition that the lid is in an open state or an indefinite state and the result of the welding diagnosis shows normal.

6. A control method for a vehicle, the vehicle including an electric power supply, an external terminal, a lid, a switch, and an electronic control unit, the external terminal being configured to be capable of outputting electric power of the electric power supply to an external load, the external terminal being configured to be capable of being input electric power for charging the electric power supply from an external electronic power supply, the lid being disposed in the external terminal, the switch being disposed at an electric circuit between the external terminal and the electric power supply, the switch being configured to be closed while the output or the input of the electric power is performed through the external terminal, and the switch being configured to be opened during traveling, the control method comprising:
   executing, by the electronic control unit, welding diagnosis for the switch;

detecting, by the electronic control unit, an open-closed state of the lid; and determining, by the electronic control unit, whether to permit the vehicle to travel based on the result of a welding diagnosis and the open-closed state of the lid, wherein the electronic control unit is configured to determine that the traveling can be permitted, on a condition that the lid is in a closed state and the result of the welding diagnosis shows a one pole welding abnormality of the switch.

7. A vehicle comprising:

an electric power supply;

an external terminal configured to be capable of outputting electric power of the electric power supply to an external load, the external terminal being configured to be capable of being input electric power for charging the electric power supply from an external electric power supply;

a lid disposed in the external terminal;

a switch disposed at an electric circuit between the external terminal and the electric power supply; and an electronic control unit configured to control the switch, the electronic control unit being configured to close the switch while the output or the input of the electric power is performed through the external terminal, the electronic control unit being configured to open the switch during traveling, the electronic control unit being configured to execute welding diagnosis for the switch, and the electronic control unit being configured to determine whether to permit the vehicle to travel based on a result of the welding diagnosis and an open-closed state of the lid;

wherein the electronic control unit is configured to determine that the traveling can be permitted, on a condition that the lid is in an open state or an indefinite state and the result of the welding diagnosis shows normal.

* * * * *